UNITED STATES PATENT OFFICE.

EMERSON H. STRICKLER, OF NEW YORK, N. Y., ASSIGNOR TO GENERAL CHEMICAL COMPANY, A CORPORATION OF NEW YORK.

EFFERVESCENT COMPOUND.

1,037,078.  Specification of Letters Patent.  Patented Aug. 27, 1912.

No Drawing.  Application filed February 29, 1912.  Serial No. 680,723.

*To all whom it may concern:*

Be it known that I, EMERSON H. STRICKLER, a citizen of the United States, and resident of the borough of Manhattan, city, county, and State of New York, have invented certain new and useful Improvements in Effervescent Compounds, of which the following is a specification.

The object of the present invention is to make monosodium phosphate useful in baking powder and in effervescent salts generally as an acid component. The use of this substance, whose chemical formula aside from water of crystallization, is said to be $NaH_2PO_4$, as the acid component in a baking powder, has hitherto resulted in a failure because it is intensely hygroscopic. (See U. S. Patent No. 674,140, May 14, 1901, lines 93 to 96.)

Various attempts have been made from time to time to render acid baking powder ingredients more stable, *i. e.*, less prone to change, such as coating them with wax or waxlike material, or treating them with starch or flour (see U. S. Patent No. 692,451, German Patent No. 144,289, British Patent No. 842 of 1911). Others have used wax or waxlike substances with mono-ammonium phosphate (British Patent No. 842 of 1911). Attempts to render monosodium phosphate useful as a baking powder ingredient have been made by changing its chemical character by converting it into a pyrophosphate $Na_2H_2P_2O_7$, or into a still different compound, $Na_3H_4P_3O_{11}$ by the application of heat to it above 350° F., preferably 375° to 425° F. (U. S. Patent No. 674,140).

I have found that monosodium phosphate may be stabilized by providing the same with an integral coating of starch or of di-sodium phosphate. I have found also that bi-carbonate of soda may be made more stable by being provided with an integral coating of di-sodium phosphate.

Of course, my invention is not limited to baking powder, which is here considered an effervescent salt, containing a diluent such as starch, but may be used wherever the substances above referred to may profitably be employed in a more stable condition than heretofore.

It is, of course, obvious that I may employ the monosodium phosphate stabilized in the manner hereinafter described, together with bi-carbonate of soda in ordinary condition, with or without the addition of starch, for use in connection with baking; or I may employ the stabilized monosodium phosphate together with bi-carbonate of soda also treated as hereinafter described, with or without the addition of starch: or I may use such bi-carbonate of soda as the alkali ingredient in ordinary baking powders without the use of monosodium phosphate.

In the following examples I have given illustrative methods for carrying out my invention. These methods may, of course, be varied within wide limits without departing from the spirit of my invention as set forth in the appended claims.

*Method A.*—Monosodium phosphate stabilized with starch can be prepared as follows: To 800 parts crystallized monosodium phosphate add 150 parts water; heat to boiling temperature. A solution of about 54° Bé. (hot) is thus obtained. Add 342 parts starch and stir until the starch has all been "worked in" and the hot mixture is of a creamlike consistency. It is then cooled under the proper conditions to obtain a powder of 100 mesh or finer and one that after having been dried at a temperature below its fusing point is suitable without any grinding for the acid constituent of a baking powder. This fine granulation can be secured by cooling the mixture by either of the following methods: (1) Agitate vigorously until it has reached atmospheric temperature. (2) Cool without agitation in an apparatus designed to secure very rapid cooling. (For such an apparatus see U. S. Patent No. 915,633). Dry the mixture prepared by methods (1) or (2) beginning at a temperature of 90° F. and gradually increasing to 212° F. The drying should be so conducted that the monosodium phosphate does not fuse at any stage of the drying.

*Method B.*—Mix together 800 parts monosodium phosphate crystals, 342 parts starch and 150 parts water, and grind the mixture in a suitable mill such as a chaser, to a 100 mesh size or finer. Dry the mixture beginning at a temperature of 90° F. and gradually increasing to 212° F. The drying should be so conducted that the monosodium phosphate does not fuse at any stage of the drying. Or, as I have also found, dry or nearly dry monosodium phosphate finely ground (to, say, 100 mesh) may be mixed with undried starch (which usually contains about 10% moisture) and the whole properly dried as above described, when the same result is obtained.

*Method C. Using di-sodium phosphate.*—Thoroughly wet crystallized monosodium phosphate in fine powder with a saturated solution of di-sodium phosphate at about 110° F.; remove the excess liquor immediately by the suitable use of a pressure filter or of a centrifugal machine; when this removal has been effected, dry the residue by exposing it to a temperature of 90° F., gradually increasing the same to 212° F.; the temperature rise should not be so rapid as to cause any fusing at any time. The product when properly prepared ought to contain about 4% of di-sodium phosphate and about 96% monosodium phosphate.

NON-HYGROSCOPIC AND GRANULAR SODIUM BICARBONATE.

*Method D.*—Thoroughly wet sodium bicarbonate with a saturated solution (36 Bé.) of disodium phosphate whose temperature should not be above 110° F.; immediately remove the excess liquor by the suitable use of a pressure filter or of a centrifugal machine; when the removal has been effected, dry the residue at an initial temperature of 90° F.; the product when properly prepared ought to contain about 3% disodium phosphate and about 97% sodium bicarbonate.

EFFERVESCENT SALTS WITH OR WITHOUT A DILUENT.

*Without a diluent.*

*Method E.*—Suitably mix the following: product of Example C 60 parts, sodium bicarbonate 40 parts.

*Method F.*—Suitably mix the following: Sodium bicarbonate prepared as in Example D 31.5 parts, cream tartar 68.5 parts.

In both these cases the material should be preferably so granulated as to pass a 100 mesh screen and remain on a 200 mesh screen, or coarser, if conditions seem to require it.

*With a diluent.*

*Method G.*—Suitably mix the following: product of Example A or B 60 parts, sodium bicarbonate 26 parts, dried starch 14 parts.

*Method H.*—Suitably mix the following: product of Example C 41.7 parts, sodium bicarbonate 26.0 parts, dried starch, 32.3 parts.

To use the product of Example D in G, H, substitute the corresponding amount of the product of Example D for the amount of sodium bicarbonate there directed; make a corresponding reduction in the amount of starch added.

I claim:

1. As a new article of manufacture stabilized monosodium phosphate.
2. As a new article of manufacture monosodium phosphate stabilized by means of starch.
3. As a new article of manufacture an effervescent salt containing monosodium phosphate as an acid ingredient.
4. As a new article of manufacture an effervescent salt containing as an acid ingredient stabilized monosodium phosphate.
5. As a new article of manufacture an effervescent salt containing as an acid ingredient monosodium phosphate stabilized by means of starch.
6. Process of stabilizing a crystallizable salt which consists in mixing starch with the hot salt solution, grinding the mixture while the whole cools to room temperature, and then drying the result.
7. Process of stabilizing a crystallizable salt which comprises adding starch to a hot solution of the crystallizable salt, working the mixture and agitating the whole while it cools to room temperature.
8. Process of stabilizing monosodium phosphate which comprises adding starch to a hot solution of the monosodium phosphate, working the mixture and agitating the whole while it cools to room temperature.
9. Process of stabilizing a crystallizable salt which comprises adding starch to a hot solution of the crystallizable salt, working the mixture and then rapidly cooling the same to room temperature.
10. Process of stabilizing monosodium phosphate which comprises adding starch to a hot solution of the monosodium phosphate, working the mixture, and then rapidly cooling the same to room temperature.
11. Process of stabilizing a crystallizable salt which comprises grinding a mixture of the crystallizable salt, starch and water to powder.
12. Process of stabilizing monosodium phosphate which comprises grinding a mixture of monosodium phosphate, starch and water to powder.
13. Process of stabilizing monosodium phosphate which consists in adding starch to a hot saturated solution thereof, grinding the result while the whole cools to room temperature, and drying the result.

In testimony whereof I have hereunto set my hand in the presence of two subscribing witnesses.

EMERSON H. STRICKLER.

Witnesses:
 FRANK F. KIRKPATRICK,
 LOUIS ALEXANDER.